(12) United States Patent
Lee et al.

(10) Patent No.: US 9,491,592 B2
(45) Date of Patent: Nov. 8, 2016

(54) METHOD AND APPARATUS FOR TRANSMITTING INDICATION IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 14/417,512

(22) PCT Filed: Aug. 14, 2013

(86) PCT No.: PCT/KR2013/007321
§ 371 (c)(1),
(2) Date: Jan. 26, 2015

(87) PCT Pub. No.: WO2014/027837
PCT Pub. Date: Feb. 20, 2014

(65) Prior Publication Data
US 2015/0215745 A1    Jul. 30, 2015

Related U.S. Application Data

(60) Provisional application No. 61/683,693, filed on Aug. 15, 2012.

(51) Int. Cl.
| | | |
|---|---|---|
| H04J 1/16 | (2006.01) | |
| H04H 20/71 | (2008.01) | |
| H04W 4/00 | (2009.01) | |
| H04W 36/00 | (2009.01) | |
| H04W 4/06 | (2009.01) | |
| H04W 72/00 | (2009.01) | |
| H04W 76/00 | (2009.01) | |
| H04L 12/18 | (2006.01) | |

(52) U.S. Cl.
CPC ............ *H04W 4/06* (2013.01); *H04W 72/005* (2013.01); *H04L 12/189* (2013.01); *H04W 76/002* (2013.01)

(58) Field of Classification Search
CPC ...... H04L 12/189; H04W 4/06; H04H 20/71
See application file for complete search history.

(56) References Cited

U.S. PATENT DOCUMENTS

| | | | |
|---|---|---|---|
| 2011/0141908 A1* | 6/2011 | Ishida | H04W 48/02 370/241 |
| 2012/0082105 A1 | 4/2012 | Hwang et al. | |
| 2012/0178465 A1 | 7/2012 | Lin et al. | |
| 2013/0039250 A1* | 2/2013 | Hsu | H04H 20/71 370/312 |

(Continued)

OTHER PUBLICATIONS

Huawei, "Discussion on UE behavior while wait timer is running," 3GPP TSG-RAN WG2 meeting #59, R2-073588, Aug. 2007, 3 pages.

(Continued)

*Primary Examiner* — Melanie Jagannathan
(74) *Attorney, Agent, or Firm* — Lee, Hong, Degerman, Kang & Waimey

(57) ABSTRACT

A method and apparatus for transmitting an indication in a wireless communication is provided. A user equipment (UE) transmits a first indication indicating at least one of first information and second information, starts a timer, and transmits a second indication if the first information included in the first indication is changed while the timer is running.

12 Claims, 8 Drawing Sheets

(56) References Cited

U.S. PATENT DOCUMENTS

| | | | |
|---|---|---|---|
| 2013/0083715 A1* | 4/2013 | Etemad | H04W 52/04 |
| | | | 370/312 |
| 2013/0301509 A1* | 11/2013 | Purnadi | H04L 65/4076 |
| | | | 370/312 |
| 2014/0044035 A1* | 2/2014 | Hwang | H04W 72/005 |
| | | | 370/312 |

OTHER PUBLICATIONS

MediaTek, "Mechanism for MBMS interest indication," 3GPP TSG-RAN2 #76 Meeting, R2-116096, Nov. 2011, 5 pages.

Samsung, "TP on Introducing common procedure for UE status indication," 3GPP TSG-RAN WG2 Meeting #78, R2-122631, May 2012, 11 pages.

PCT International Application No. PCT/KR2013/007321, Written Opinion of the International Searching Authority dated Nov. 25, 2013, 1 page.

Catt, "Timer Control of MBMSInterestIndication", 3GPP TSG RAN WG2 Meeting #78, R2-123329, Aug. 13-17, 2012, 4 pages.

Samsung, "Report on [78#46] LTW/MBMS: MBMS 36.331 CR [Samsung]", 3GPP TSG-RAN2#78 meeting Tdoc, R2-124095, Aug. 13-17, 2012, 6 pages.

European Patent Office Application No. 13829464.0, Search Report dated Apr. 11, 2016, 10 pages.

* cited by examiner

METHOD AND APPARATUS FOR TRANSMITTING INDICATION IN WIRELESS COMMUNICATION SYSTEM

CROSS-REFERENCE TO RELATED APPLICATIONS

This application is the National Stage filing under 35 U.S.C. 371 of International Application No. PCT/KR2013/007321, filed on Aug. 14, 2013, which claims the benefit of U.S. Provisional Application Ser. No. 61/683,693, filed on Aug. 15, 2012, the contents of which are hereby incorporated by reference herein in their entirety.

BACKGROUND OF THE INVENTION

Field of the Invention

The present invention relates to wireless communications, and more particularly, to a method and apparatus for transmitting an indication in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE provides a multimedia broadcast/multicast service (MBMS). The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

In an area, a specific base station (BS) may use multiple frequencies at the same time. For using radio resources efficiently, the network may provide the MBMS on only one frequency among the multiple frequencies, and may provide dedicated bearers to each user equipment (UE) on all multiple frequencies. In this case, if the UE, which receives a service using the dedicated bearer in a frequency not providing the MBMS, wants to receive the MBMS, the UE may have to be handed over to a frequency providing the MBMS.

For this, a network control option may be adopted as a basic architecture for handling the MBMS. The network may be informed about UE's interest in the MBMS by the UE, and then the network tries to ensure that the UE is able to receive the MBMS. That is, if the UE would like to receive the MBMS, the UE transmits an MBMS interest indication to the BS. The MBMS interest indication provides MBMS interest information at the level of a frequency rather than of an individual service, and indicates UE's interest in MBMS frequency reception. Upon receiving the MBMS interest indication from the UE, the BS acknowledges that the UE wants to receive the MBMS, and makes the UE move to a frequency providing the MBMS. The MBMS interest indication may indicate that the UE wants to receive the MBMS. The MBMS interest indication may include information on the frequency which provides the MBMS that the UE wants to receive. The UE may obtain the information on the frequency providing the MBMS that the UE wants to receive, by receiving a system information block (SIB)-15 from a serving cell. The UE may transmit the MBMS interest indication whenever the UE's interest changes.

The UE may transmit MBMS interest indications many times. Excessive transmissions of MBMS interest indications will cause the network to be overloaded.

Accordingly, a method for restricting transmission of MBMS interest indications may be required.

SUMMARY OF THE INVENTION

The present invention provides a method for transmitting an indication in a wireless communication system. The present invention provides a method for restricting transmission of a multimedia broadcast/multicast service (MBMS) interest indications according to contents included in the MBMS interest indications.

In an aspect, a method for transmitting, by a user equipment (UE), an indication in a wireless communication is provided. The method includes transmitting a first indication indicating at least one of first information and second information, starting a timer, and transmitting a second indication if the first information included in the first indication is changed while the timer is running.

The first information may correspond to information on frequency.

The first information may correspond to list of multimedia broadcast/multicast service (MBMS) frequencies providing MBMS sessions which the UE is receiving or interested to receive.

The second information may correspond to information on priority.

The second information may indicate whether the UE prioritizes MBMS reception above unicast reception.

The first indication and the second indication may relate to inter-frequency mobility.

The first indication and the second indication may be MBMS interest indications.

The timer may be configured by a timer value received from a network.

The timer value may be received via system information or via a dedicated radio resource control (RRC) message.

The timer may be fixed to a specific value.

In another aspect, a user equipment (UE) in a wireless communication is provided.

The UE includes a radio frequency (RF) unit for transmitting or receiving a radio signal, and a processor coupled to the RF unit, and configured for transmitting a first indication indicating at least one of first information and second information, starting a timer, and transmitting a second indication if the first information included in the first indication is changed while the timer is running.

Transmission MBMS interest indications can be selectively prohibited.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
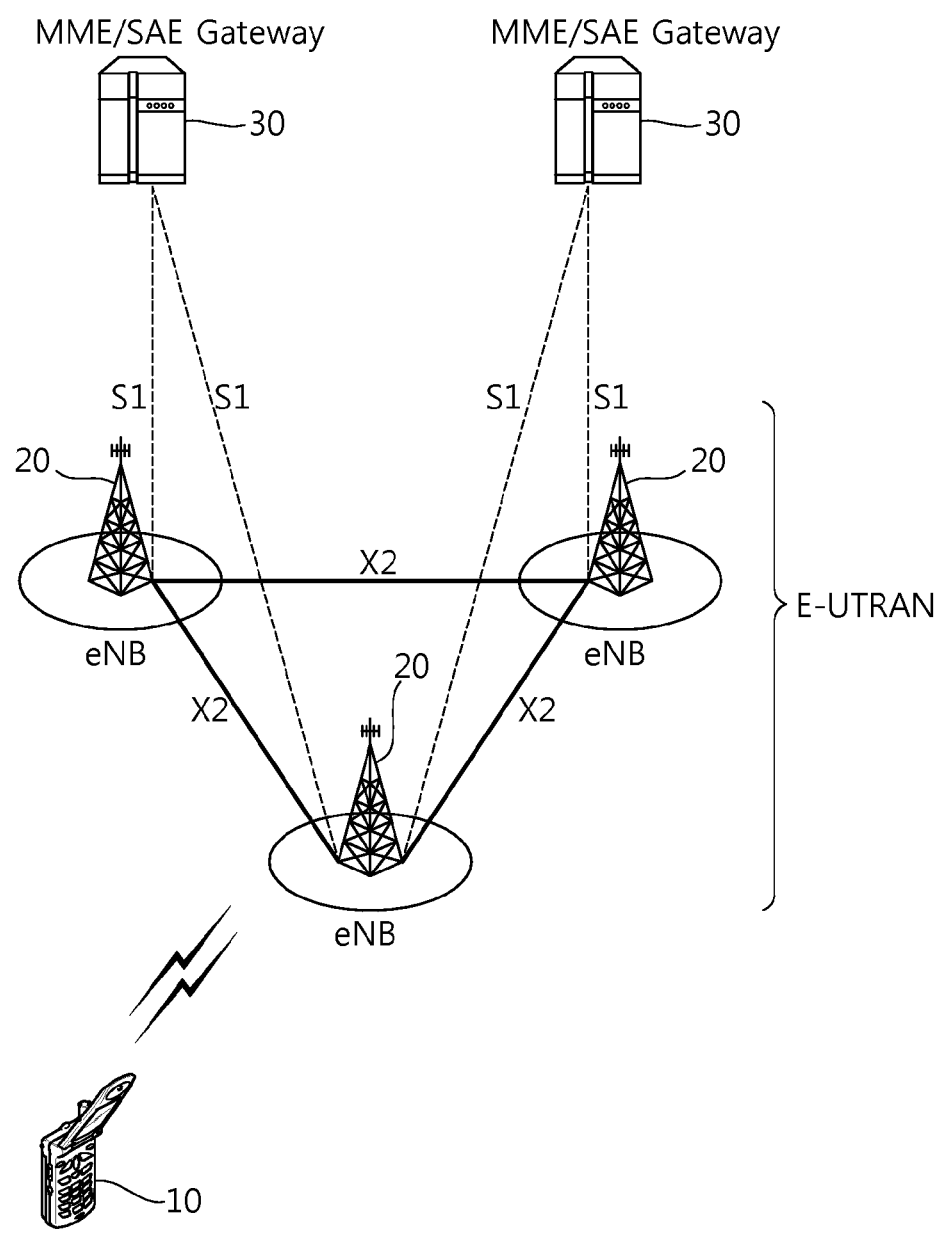
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
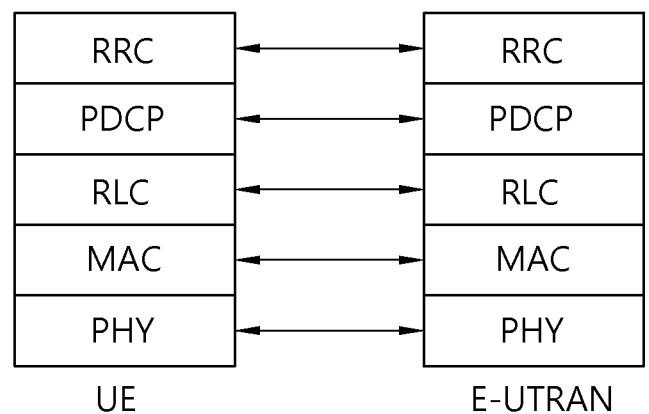
FIG. 2 is a diagram showing radio interface protocol architecture for a control plane.
Figure 3:
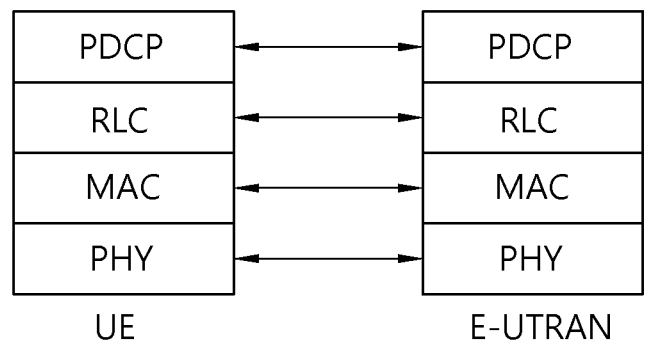
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
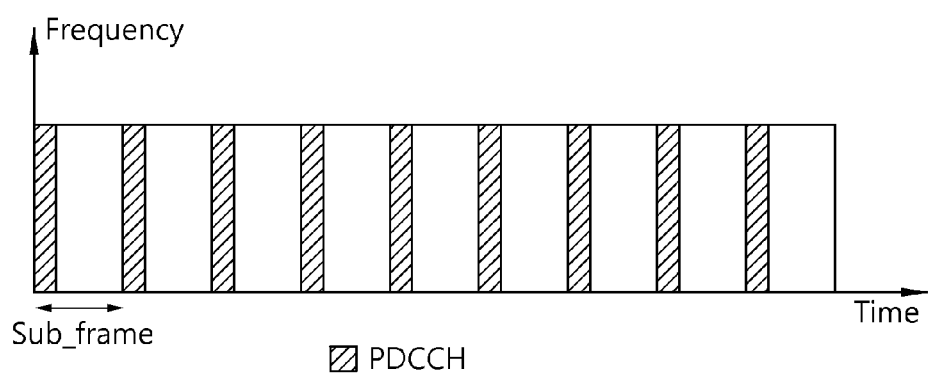
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether an RRC of a user equipment (UE) is logically connected to an RRC of an E-UTRAN. When an RRC connection is established between an RRC layer of the UE and an RRC layer of the E-UTRAN, the UE is in an RRC connected state (RRC_CONNECTED), and otherwise the UE is in an RRC idle state (RRC_IDLE). Since the UE in the RRC_CONNECTED has the RRC connection established with the E-UTRAN, the E-UTRAN can recognize the existence of the UE in the RRC_CONNECTED and can effectively control the UE. Meanwhile, the UE in the RRC_IDLE cannot be recognized by the E-UTRAN, and a core network (CN) manages the UE in unit of a tracking area (TA) which is a larger area than a cell. That is, only the existence of the UE in the RRC_IDLE is recognized in unit of a large area, and the UE must transition to the RRC_CONNECTED to receive a typical mobile communication service such as voice or data communication.

When the user initially powers on the UE, the UE first searches for a proper cell and then remains in the RRC_IDLE in the cell. When there is a need to establish an RRC connection, the UE which remains in the RRC_IDLE may establish the RRC connection with the RRC of the E-UTRAN through an RRC connection procedure and then may transition to the RRC_CONNECTED. The UE which remains in the RRC_IDLE may need to establish the RRC connection with the E-UTRAN when uplink data transmission is necessary due to a user's call attempt or the like or when there is a need to transmit a response message upon receiving a paging message from the E-UTRAN.

The UE which remains in the RRC_IDLE can persistently perform cell reselection to find a better cell. In this case, the UE can perform measurement and cell reselection by using frequency priority information. That is, the UE can determine which frequency will be preferentially considered when performing frequency measurement and cell reselection on the basis of the frequency priority information. The UE can receive the frequency priority information by using system information or an RRC connection release message, or can receive the frequency priority information from another radio access technology (RAT) in inter-RAT cell reselection.

An MBMS is described in detail. For MBMS, the following definitions may be introduced. It may be referred to Section 15 of 3GPP TS 36.300 V12.2.0 (2012-06).

Multicast broadcast single frequency network (MBSFN) synchronization area: an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas MBSFN transmission or a transmission in MBSFN mode: a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e. when it knows which MBSFN area applies for the service(s) it is interested to receive.

MBSFN area reserved cell: A cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast/multicast service center (BM-SC) and the MBMS coordination entity (MCE).

Synchronization Period: The synchronization period provides the time reference for the indication of the start time of each synchronization sequence. The time stamp which is provided in each SYNC PDU is a relative value which refers to the start time of the synchronization period. The duration of the synchronization period is configurable.

Figure 5:
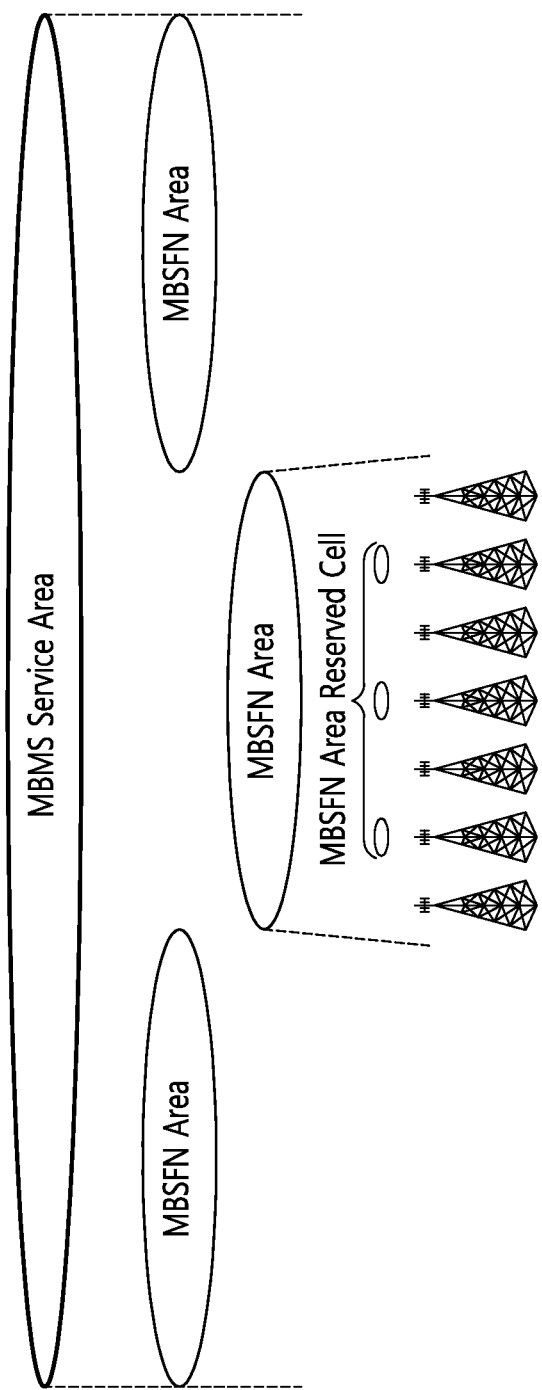
FIG. 5 shows definitions of MBMS.

FIG. 5 shows definitions of MBMS.

Referring to FIG. 5, an MBMS service area may consists of one or more MBSFN area. In each MBSFN area, a plurality of cells, including a plurality of MBSFN area reserved cells, may exist.

As a transport channel for an MBMS, an MCH can be mapped to an MCCH which is a logical channel for a control signal and an MTCH which is a logical channel for data. The MCCH can transmit an MBMS-related RRC message. The MTCH can transmit traffic of a specific MBMS. A single MCCH channel may exist for every single multicast-broadcast single frequency network (MBSFN) for transmitting MBMS information and traffic. Alternatively, when a plurality of MBSFN areas are provided in a single cell, the UE may receive a plurality of MCCHs. When the MBMS-related RRC message is changed in a specific MCCH, the PDCCH can transmit an MBMS radio network temporary identity (M-RNTI) and an MCCH indicator indicating a specific MCCH. By receiving the M-RNTI and the MCCH indicator through the PDCCH, the UE supporting the MBMS can determine that the MBMS-related RRC message is changed in the specific MCCH and can receive the specific MCCH. An RRC message of the MCCH can be changed in every modification period, and can be repetitively broadcast in every repetition period.

While the UE receives the MBMS, the UE may receive a dedicated service. For example, some users may watch TV through the MBMS using smart phones at the same time while making a use of an instant messaging (IM) service using the smart phones. In this case, the MBMS may be provided on the MTCH received by multiple UEs. A service provided to each UE respectively, such as the IM service, may be provided on a dedicated bearer such as the DCCH or a dedicated traffic channel (DTCH).

MBMS continuity is described. The UE who wants to receive a specific MBMS acknowledges information on frequency and time on which the specific MBMS is provided. When the MBMS is on air or is going to be broadcast soon, the UE sets a priority of a frequency providing the MBMS to the highest priority. The UE in the RRC_IDLE can move to a cell providing the MBMS and receive the MBMS by performing a cell reselection procedure using the frequency priority information which is set.

Figure 6:
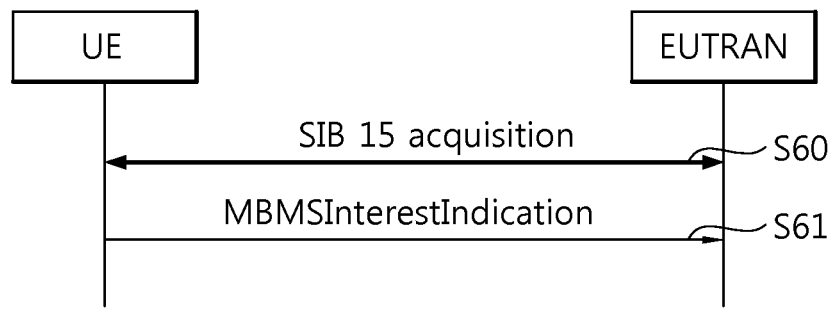
FIG. 6 shows an MBMS interest indication procedure.

FIG. 6 shows an MBMS interest indication procedure. The purpose of this procedure is to inform the E-UTRAN that the UE is receiving or is interested to receive MBMS via an MRB, and if so, to inform the E-UTRAN about the priority of MBMS versus unicast reception.

Referring to FIG. 6, at step S60, the UE acquires a system information block 15 (SIB15) from the E-UTRAN. At step S61, the UE transmits an MBMS interest indication (MBMSInterestIndication) message to the E-UTRAN.

As described above, the MBMSInterestIndication message is used to inform the E-UTRAN that the UE is receiving/interested to receive or no longer receiving/interested to receive the MBMS via an MBMS RB (MRB). A signaling radio bearer for the MBMSInterestIndication message is an SRB1, and a logical channel for transmission of the MBMSInterestIndication message is a DCCH. Table 1 and Table 2 shows an example of contents included in the MBMSInterestIndication message.

TABLE 1

```
-- ASN1START
MBMSInterestIndication-r11 ::=        SEQUENCE {
    criticalExtensions                CHOICE {
        c1                                CHOICE {
            interestIndication-r11            MBMSInterestIndication-r11-IEs,
            spare3 NULL, spare2 NULL, spare1 NULL
        },
        criticalExtensionsFuture          SEQUENCE { }
    }
}
MBMSInterestIndication-r11-IEs ::=    SEQUENCE {
    mbms-FreqList-r11                         CarrierFreqListMBMS-r11
OPTIONAL,
    mbms-Priority-r11                         ENUMERATED {true}
OPTIONAL,
    lateNonCriticalExtension                  OCTET STRING
OPTIONAL,
    nonCriticalExtension                      SEQUENCE { }
OPTIONAL
}
-- ASN1STOP
```

TABLE 2

MBMSInterestIndication field descriptions mbms-FreqList

List of MBMS frequencies providing MBMS sessions which the UE is receiving or interested to receive.

mbms-Priority

Indicates whether the UE prioritises MBMS reception above unicast reception. The field is present (i.e. value true), if the UE prioritises reception of all listed MBMS frequencies above reception of any of the ongoing unicast bearers. Otherwise the field is absent.

A method for selectively prohibiting transmissions of MBMS interest indications according to embodiments of the present invention is described below.

An embodiment of the present invention includes transmitting an indication to the network, deciding whether or not to start a timer depending on what is included in the indication or which information in the indication is updated compared to the previously transmitted indication, and prohibiting another transmission of the indication while the timer is running. The indication may be an MBMS interest indication that includes interested MBMS service/frequency and/or MBMS priority over unicast services. The timer may start if the indication includes MBMS priority, i.e. mbms-Priority field, over unicast services or if the MBMS priority changes. Or, the timer may not start when the indication includes interested MBMS service/frequency, i.e. mbms-FreqList field, or when the interested MBMS service/frequency changes.

According to an embodiment of the present invention, the UE may selectively decide whether or not to start the timer for prohibiting transmission of the MBMS interest indication. If the mbms-Priority field is included in the MBMS interest indication, the UE starts the timer. If the mbms-Priority field is not included in the MBMS interest indication, the UE does not start the timer. That is, while the timer is running, the UE may not be allowed to transmit end the MBMS interest indication including the mbms-Priority field. On the other hand, while the timer is running, the UE may be allowed to transmit the MBMS interest indication not including mbms-Priority field.

According to another embodiment of the present invention, while the timer is running, if the mbms-Priority field is changed and if the mbms-FreqList field is not changed, the UE does not transmit the MBMS interest indication. While the timer is running, if the mbms-Priority field is changed and if the mbms-FreqList field is changed, the UE transmits the MBMS interest indication. After the timer is expired or while the timer is not running, if the mbms-Priority field is changed or if the mbms-FreqList field is changed, the UE transmits the MBMS interest indication.

The network may configure the timer by transmitting a timer value to the UE via system information or via a dedicated RRC message such as an RRC connection reconfiguration message. Alternatively, the timer is fixed to a specific value such as 2 or 5 seconds.

Figure 7:
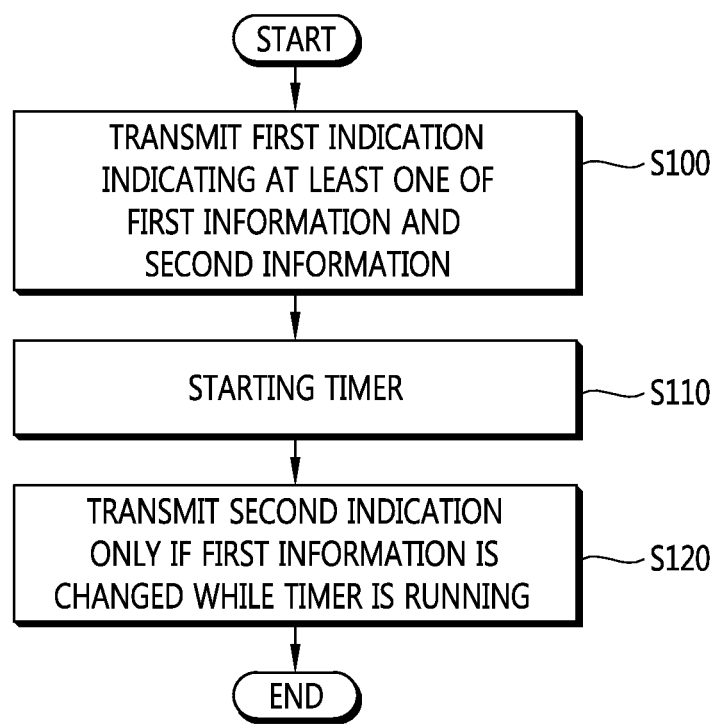
FIG. 7 shows an example of a method for transmitting an indication according to an embodiment of the present invention.

FIG. 7 shows an example of a method for transmitting an indication according to an embodiment of the present invention.

At step S100, the UE transmits a first indication indicating at least one of first information and second information. The first information may correspond to information on frequency. Specifically, the first information may correspond to list of MBMS frequencies providing MBMS sessions which the UE is receiving or interested to receive. The second information may correspond to information on priority. Specifically, the second information may indicate whether the UE prioritizes MBMS reception above unicast reception.

At step S110, the UE starts a timer. The timer may be configured by a timer value received from a network via system information or via an RRC message. Or, the timer may be fixed to a specific value.

At step S120, the UE transmits a second indication only if the first information included in the first indication is changed while the timer is running.

The first indication and the second indication may relate to inter-frequency mobility. Specifically, the first indication and the second indication may be MBMS interest indications.

Operations of the UE in RRC_CONNECTED according to an embodiment of the present invention described above are described below.

An MBMS capable UE in RRC_CONNECTED may initiate the procedure in several cases including upon successful connection establishment, upon entering or leaving the service area, upon session start or stop, upon change of interest, upon change to a primary cell (PCell) broadcasting of SystemInformationBlockType15.

The UE shall only:

1> if SystemInformationBlockType15 is broadcast by the PCell; and has been acquired by the UE:

2> if the UE did not transmit an MBMSInterestIndication message since last entering RRC_CONNECTED; or 2> if since the last time the UE transmitted an MBMSInterestIndication message, the UE connected to a PCell not broadcasting SystemInformationBlockType15:

3> if the set of MBMS frequencies of interest, determined is not empty:

4> initiate the transmission of the MBMSInterestIndication message;

2> else:

3> if the set of MBMS frequencies of interest, determined has changed since the last transmission of the MBMSInterestIndication message; or 3> if the prioritization of reception of all indicated MBMS frequencies compared to reception of any of the established unicast bearers has changed since the last transmission of the MBMSInterestIndication message and if more than 5 s has elapsed since the last transmission of the MBMSInterestIndication message including mbms-Priority:

4> initiate the transmission of the MBMSInterestIndication message.

The UE shall:

1> consider a frequency to be part of the MBMS frequencies of interest if the following conditions are met:

2> if at least one MBMS session the UE is receiving or interested to receive via an MRB is ongoing or about to start; and 2> if for at least one of these MBMS sessions SystemInformationBlockType15 acquired from the PCell includes for the concerned frequency one or more MBMS SAI as indicated in the USD for this session; and 2> the UE is capable of simultaneously receiving the set of MBMS frequencies of interest in accordance with supportedBandCombination it included in the UE-EUTRA-Capability and considering that it is required to support MBMS reception on any frequency part of the supported band combinations.

The UE shall set the contents of the MBMSInterestIndication message as follows:

1> if the set of MBMS frequencies of interest is not empty:

2> include mbms-FreqList and set it to include the MBMS frequencies of interest;

2> include mbms-Priority if the UE prioritizes reception of all indicated MBMS frequencies above reception of any of the established unicast bearers.

The UE shall submit the MBMSInterestIndication message to lower layers for transmission.

Alternatively, if mbms-Priority is changed, the UE can transmit the mbms-Priority in the MBMS interest indication only when one or more RBs (desirably, one or more DRBs) are established, only when one or more established RBs (desirably, one or more established DRBs) are released, when the UE starts to receive a new MBMS service on an MRB (MRB addition), or when UE stops receiving a MBMS service on a MRB (MRB release).

Operations of the UE in RRC_CONNECTED according to an embodiment of the present invention described above are described below.

The UE shall only:

1> if SystemInformationBlockType15 is broadcast by the PCell; and has been acquired by the UE:

2> if the UE did not transmit an MBMSInterestIndication message since last entering RRC_CONNECTED; or 2> if since the last time the UE transmitted an MBMSInterestIndication message, the UE connected to a PCell not broadcasting SystemInformationBlockType15:

3> if the set of MBMS frequencies of interest, determined is not empty:

4> initiate the transmission of the MBMSInterestIndication message;

2> else:

3> if the set of MBMS frequencies of interest, determined has changed since the last transmission of the MBMSInterestIndication message; or 3> if the prioritization of reception of all indicated MBMS frequencies compared to reception of any of the established unicast bearers has changed since the last transmission of the MBMSInterestIndication message, only after/when one or more DRB/SRB/MRB is added, modified or released, or after receiving RRCConnectionReconfiguration message including added/modified/released DRB/SRB:

4> initiate the transmission of the MBMSInterestIndication message.

Alternatively, if mbms-Priority is changed, the UE can transmit the mbms-Priority in the MBMS interest indication only once per RRC connection. Namely, the UE in RRC_CONNECTED cannot change the mbms-Priority after transmitting the MBMS interest indication including the mbms-Priority to the network, until the UE releases this RRC connection.

Alternatively, if mbms-Priority is changed, the UE can transmit the mbms-Priority in the MBMS interest indication only once at a cell. Namely, the UE in RRC_CONNECTED cannot change the mbms-Priority after transmitting the MBMS interest indication including the mbms-Priority to the cell, until the UE changes the cell, or until the UE performs handover or connection re-establishment.

Figure 8:
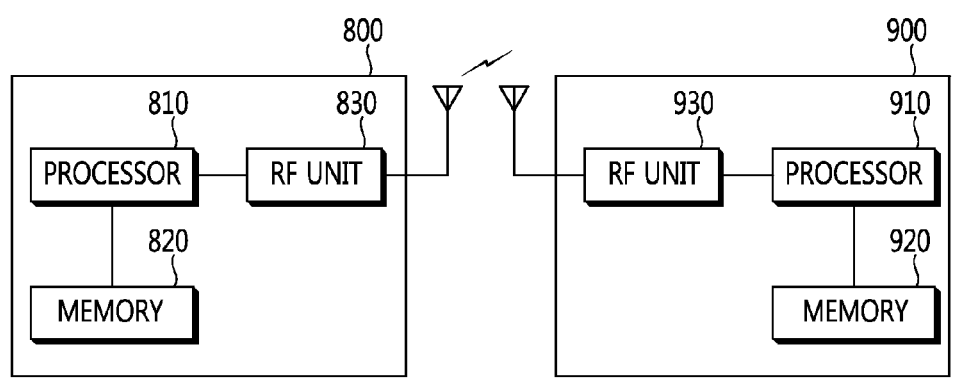
FIG. 8 is a block diagram showing wireless communication system to implement an embodiment of the present invention.

FIG. 8 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for a user equipment (UE) transmitting an indication in a wireless communication, the method comprising:

transmitting a multimedia broadcast/multicast service (MBMS) interest indication indicating that the UE is interested to receive or no longer interested to receive an MBMS session, the MBMS interest indication including at least a list of interested MBMS frequencies or a MBMS priority; and determining whether to start a timer based on a content of the MBMS interest indication, wherein the timer is a prohibit timer that is used to prohibit for the transmission of the MBMS interest indication, wherein the timer is started if the MBMS interest indication includes the MBMS priority and the timer is not started if the MBMS interest indication includes the list of interested MBMS frequencies, and wherein the MBMS interest indication is selectively transmitted while the timer is running based on changes of the list of interested MBMS frequencies or the MBMS priority.

2. The method of claim 1, wherein the MBMS priority indicates whether the UE prioritizes MBMS reception above unicast reception.

3. The method of claim 1, wherein the MBMS interest indication is related to inter-frequency mobility.

4. The method of claim 1, wherein the timer is configured by a timer value received from a network.

5. The method of claim 4, wherein the timer value is received via system information or via a dedicated radio resource control (RRC) message.

6. The method of claim 1, wherein the timer is set to a specific value.

7. A user equipment (UE) in a wireless communication, the UE comprising:
   a radio frequency (RF) unit for transmitting or receiving a radio signal; and
   a processor coupled to the RF unit, and configured for:
   transmitting a multimedia broadcast/multicast service (MBMS) interest indication indicating that the UE is interested to receive or no longer interested to receive an MBMS session, the MBMS interest indication including at least a list of interested MBMS frequencies or a MBMS priority; and
   determining whether to start a timer based on a content of the MBMS interest indication,
   wherein the timer is a prohibit timer that is used to prohibit for the transmission of the MBMS interest indication,
   wherein the timer is started if the MBMS interest indication includes the MBMS priority and the timer is not started if the MBMS interest indication includes the list of interested MBMS frequencies, and
   wherein the MBMS interest indication is selectively transmitted while the timer is running based on changes of the list of interested MBMS frequencies and/or the MBMS priority.

8. The UE of claim 7, wherein the MBMS interest indication is related to inter-frequency mobility.

9. The UE of claim 7, wherein the MBMS priority indicates whether the UE prioritizes MBMS reception above unicast reception.

10. The UE of claim 7, wherein the timer is configured by a timer value received from a network.

11. The UE of claim 10, wherein the timer value is received via system information or via a dedicated radio resource control (RRC) message.

12. The UE of claim 7, wherein the timer is set to a specific value.

* * * * *